US008792367B2

(12) United States Patent
Nie et al.

(10) Patent No.: US 8,792,367 B2
(45) Date of Patent: Jul. 29, 2014

(54) COOPMAX: A COOPERATIVE MAC WITH RANDOMIZED DISTRIBUTED SPACE TIME CODING FOR AN IEEE 802.16 NETWORK

(75) Inventors: Chun Nie, Nutley, NJ (US); Pei Liu, Forest Hills, NY (US); Thanasis Korakis, Brooklyn, NY (US); Elza Erkip, New York, NY (US); Shivendra S. Panwar, Freehold, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 654 days.

(21) Appl. No.: 13/010,951

(22) Filed: Jan. 21, 2011

(65) Prior Publication Data

US 2011/0216662 A1    Sep. 8, 2011

Related U.S. Application Data

(60) Provisional application No. 61/296,909, filed on Jan. 21, 2010.

(51) Int. Cl.
*H04W 24/00* (2009.01)
(52) U.S. Cl.
USPC ............................... 370/252; 370/315; 455/7
(58) Field of Classification Search
USPC ................................................. 370/315, 252
See application file for complete search history.

(56) References Cited

U.S. PATENT DOCUMENTS

| | | | | |
|---|---|---|---|---|
| 7,720,020 | B2 * | 5/2010 | Larsson | 370/315 |
| 8,050,619 | B2 * | 11/2011 | Horiuchi et al. | 455/7 |
| 2007/0160014 | A1 * | 7/2007 | Larsson | 370/338 |
| 2008/0175183 | A1 * | 7/2008 | Devroye et al. | 370/315 |
| 2009/0116419 | A1 * | 5/2009 | Chong et al. | 370/312 |
| 2009/0116422 | A1 * | 5/2009 | Chong et al. | 370/315 |
| 2009/0262678 | A1 * | 10/2009 | Oyman et al. | 370/315 |
| 2009/0274226 | A1 * | 11/2009 | Mondal et al. | 375/260 |
| 2010/0054137 | A1 * | 3/2010 | Deng et al. | 370/247 |
| 2010/0182898 | A1 * | 7/2010 | Li et al. | 370/208 |
| 2010/0246526 | A1 * | 9/2010 | Jing et al. | 370/329 |
| 2010/0254300 | A1 * | 10/2010 | Gulasekaran et al. | 370/315 |
| 2010/0260240 | A1 * | 10/2010 | Wang | 375/214 |
| 2010/0315989 | A1 * | 12/2010 | Reznik et al. | 370/315 |
| 2011/0122933 | A1 * | 5/2011 | Adam et al. | 375/219 |
| 2011/0124284 | A1 * | 5/2011 | Adam et al. | 455/7 |
| 2011/0207397 | A1 * | 8/2011 | Wang et al. | 455/7 |

* cited by examiner

*Primary Examiner* — Edan Orgad
*Assistant Examiner* — Emmanuel Maglo
(74) *Attorney, Agent, or Firm* — John C. Pokotylo; Straub & Pokotylo

(57) ABSTRACT

Cooperative communication is a technique that can be employed to meet the increased throughput needs of next generation WiMAX systems. In a cooperative scenario, multiple stations can jointly emulate the antenna elements of a multi-input multi-output system in a distributed fashion. A framework for a randomized distributed space-time coding ("R-DSTC") technique in the emerging relay-assisted WiMAX network, and the development of a cooperative medium access control ("MAC") layer protocol, called Coop-MAX, for R-DSTC deployment in an IEEE 802.16 system, is described. The technique described couples the MAC layer with the physical (PHY) layer for performance optimization. The PHY layer yields significant diversity gain, while the MAC layer achieves a substantial end-to-end throughput gain.

16 Claims, 13 Drawing Sheets

TABLE 1: Rate Adaptation Algorithm for R-DSTC MAC

1. For each possible first hop transmission rate $R_p$, find the set of potential helpers for $tSS$ and calculate $N_p$.

2. For each $N_p > 0$, calculate the pairwise error probability for each possible second hop rate $R'_p$ and each STC code $\phi$. ($\phi \in \Phi$) using Eq. (1).

3. Calculate effective transmission rate $R_c = 1/(1/R_p + 1/R'_p)$ for all $(R_p, R'_p)$ combinations such that the error probability is below the required PEP threshold.

4. Choose the highest effective transmission rate $R_c^*$, and denote the corresponding rate for the access link and relay link as $R_p^*$ and $R'^*_p$, respectively.

5. If $R_c^* > R_{direct}$, $tSS$ employs cooperative transmissions at rate $R_{AL} = R_p^*$ and $R_{RL} = R'^*_p$; otherwise, $tSS$ transmits directly to the destination at rate $R_{direct}$.

6. The optimal effective end-to-end throughput of that $tSS$ is $R_c^*$ when cooperative transmission is used, or $R_{direct}$ when direct transmission is used.

FIGURE 6

TABLE II: CoopMAX Configuration

| Parameters | Value |
|---|---|
| Transmit Power (RS and SS) | 200 mW |
| Coherence Time | 50 milliseconds |
| WiMAX frame size | 5 milliseconds |
| WiMAX spectrum bandwidth | 5 MHz |
| Cooperative field size in network entry message | 1 byte |
| Number of (OFDMA symbols, subcarriers) | (48, 512) |
| Each sounding zone (OFDMA Symbols × carriers) | 1 × 512 |
| Interval between two proactive estimation | 10 frames |
| Interval between two R-DSTC Control UL IE | 5 frames |
| Interval between two REP-REQ/REP-RSP | 5 frames |
| CINR field size in REP-REQ/REP-RSP | 1 byte |
| CID size in REP-REQ/REP-RSP | 2 byte |
| Mod. and Coding for CoopMAX Signaling Messages | 16QAM 3/4 |
| UL/DL Bandwidth Ratio | 1:3 |
| Max. number of helpers per tSS | 8 |
| UL Permutation Type | PUSC[a] |
| UL Traffic Type and Scheduling Type | FTP (Best Effort) |

[a] PUSC stands for Partially Used Subcarrier and denotes the mode of pilot subcarrier allocation, as defined in [1].

COOPMAX: A COOPERATIVE MAC WITH RANDOMIZED DISTRIBUTED SPACE TIME CODING FOR AN IEEE 802.16 NETWORK

§0.1 RELATED APPLICATIONS

Benefit is claimed to the filing date of U.S. Provisional Patent Application Ser. No. 61/296,909 ("the '909 provisional"), titled "COOPMAX: A COOPERATIVE MAC WITH RANDOMIZED DISTRIBUTED SPACE-TIME CODING FOR AN IEEE 802.16 NETWORK," filed on Jan. 21, 2010 and listing Chun NIE, Pei LIU, Thanasis KORAKIS, Elza ERKIP and Shivendra S. PANWAR as inventors. The '909 provisional is incorporated herein by reference. However, the scope of the claimed invention is not limited by any requirements of any specific embodiments described in the '909 provisional.

§0.0 GOVERNMENT RIGHTS

The United States Government may have certain rights in this invention pursuant to a grant awarded by the National Science Foundation. Specifically, the United States Government may have a paid-up license in this invention and the right in limited circumstances to require the patent owner to license others on reasonable terms as provided for by the terms of Grant No. 0520054 awarded by the National Science Foundation.

§1. BACKGROUND OF THE INVENTION

§1.1 Field of the Invention

The present invention concerns data communications. In particular, the present invention concerns relaying information in a wireless local area network (LAN) cooperatively.

§1.2 Background Information

As an advanced broadband wireless access technology, Worldwide Interoperability for Microwave Access ("WiMAX") has attracted a lot of research attention. While the current IEEE 802.16e standard (See, e.g., "IEEE Standard for Local and Metropolitan Area Networks—Part 16: Air Interface for Fixed Broadband Wireless Access Systems, Amendment 2 and Corrigendum 1," *IEEE* 802.16*e* (February 2006) incorporated herein by reference) has been specified for a single-hop WiMAX network, relay-assisted WiMAX has been considered for the future evolution of WiMAX standards, and is being actively investigated. (See, e.g., "Part 16: Air Interface for Fixed and Mobile Broadband Wireless Access Systems: Multihop Relay Specification," *IEEE Baseline Document for Draft Standard for Local and Metropolitan Area Networks* (April 2007) incorporated herein by reference.)

The IEEE 802.16j baseline draft proposed the concept of WiMAX mobile multi-hop relay ("MMR") system. A standard MMR system enables a subscriber station ("SS") to route its sent data through intermediate relay stations ("RSs") in order to reach the base station ("BS"). In the MMR scenario, cooperative communication is considered as an efficient solution in multi-hop transmissions because it provides robust forwarding by recruiting multiple intermediate stations to collaboratively transmit the source signal to the destination. (See, e.g., the articles: A. Sendonaris, E. Erkip, and B. Aazhang, "User Cooperation Diversity—Part I: System Description," *IEEE Transactions on Communications*, Vol. 51, No. 11, pp. 1927-1938 (November 2003); A. Sendonaris, E. Erkip, and B. Aazhang, "User Cooperation Diversity—Part II: Implementation Aspects and Performance Analysis," *IEEE Transactions on Communications*, Vol. 51, No. 11, pp. 1939-1948 (November 2003); and J. N. Laneman, D. Tse, and G. Wornell, "Cooperative Diversity in Wireless Networks: Efficient Protocols and Outage Behavior," *IEEE Trans. on Info. Theory*, Vol. 50, No. 12 (December 2004), each of which is incorporated herein by reference).

To increase the spatial diversity gain, SSs and RSs can be used as the intermediate stations to form a virtual multi-input multi-output ("MIMO") system. These RSs and SSs are called "helpers" and act as distributed antenna array elements. For a virtual MIMO system, space-time coding ("STC") is used in a distributed fashion, commonly known as distributed spacetime coding ("DSTC"), so as to achieve high diversity gains in a cooperative environment. The basic idea of DSTC is to coordinate and synchronize helpers so that each of them acts as one antenna of a conventional STC. (See, e.g., J. N. Laneman et al., *IEEE Trans. on Info. Theory*, Vol. 50, No. 12 (December 2004).)

Although DSTC is being investigated by the IEEE 802.16j/16m standard task group as a possible virtual MIMO technique (See, e.g., W. Ni, G. Shen, and S. Jin, "Cooperative Relay Approaches in IEEE 802.16j," *IEEE C*802.16*j*-07/258r 1, *IEEE 802.16 Broadband Wireless Access Working Group* (April 2007), incorporated herein by reference), it still has the following inherent drawbacks:

1) Each helper participating in a DSTC needs to be numbered so that it knows exactly which antenna it will mimic in the underlying STC. Hence the exact set of participating helpers needs to be known and distributed to the network using signaling messages;
2) Whenever rate adaptation is used, DSTC relies on detailed global channel state information between each potential helper and the source as well as the destination. The dissemination of such information leads to MAC layer signaling, which could be very costly in a mobile environment. Outdated channel state information often results in severe loss in performance;
3) Even though nodes other than the chosen helpers may decode the source information correctly, they are not allowed to transmit. This sacrifices potential diversity and coding gain; and
4) A DSTC relies on tight constraints on the time synchronization of the nodes, putting a very heavy burden on the MAC and PHY layers.

These issues can be addressed by employing Randomized Distributed Space-time Coding ("R-DSTC"). (See, e.g., the articles: B. S. Mergen and A. Scaglione, "Randomized Space-Time Coding for Distributed Cooperative Communication," *IEEE Transactions on Signal Processing*, pp. 5003-5017 (October 2007); F. Verde, T. Korakis, E. Erkip, and A. Scaglione, "On Avoiding Collisions and Promoting Cooperation: Catching Two Birds with One Stone," *IEEE SPAWC*, (July 2008) and U.S. patent application Ser. No. 12/938,101, titled "Robust Cooperative Relaying in a Wireless LAN: Cross-layer Design and Performance Analysis," filed on Nov. 2, 2010 and listing Elza ERKIP, Pei LIU, Chun NIE and Shivendra S. PANWAR as inventors, each of which is incorporated herein by reference.) R-DSTC is a novel DSTC technique with the advantages of robustness and simplicity. While the PHY layer principles of the R-DSTC technique have previously been studied, there is a need for improvement in the application of the R-DSTC technique in practical wireless networks. A preliminary MAC layer effort is presented in the article P. Liu, Y. Liu, T. Korakis, A. Scaglione, E. Erkip, and S. Panwar, "Cooperative MAC for Rate Adaptive Randomized Distributed Space-Time Coding," *Proc., IEEE Globecom* (November 2008) (incorporated herein by reference) and initial crosslayer design issues are explored in the article F. Verde, et al., *IEEE SPAWC* (July 2008). However, these papers do not adapt the R-DSTC protocol design to WiMAX networks. Crucially, the additional overhead required at the MAC layer needs to be quantified in order to understand the overall gains from this PHY layer technique.

Thus, it would be useful to provide an MMR system that is applicable to various practical wireless networks (such as an IEEE 802.16 (WiMAX) network for example) and that avoids the drawbacks of DSTC.

§2. SUMMARY OF THE INVENTION

Embodiments consistent with the present invention provide, a MAC layer protocol, called CoopMAX, which provides the advantages of R-DSTC in the framework of next-generation WiMAX networks. CoopMAX is a cross-layer methodology that facilitates deploying R-DSTC in an IEEE 802.16 network.

Exemplary embodiments consistent with the present invention may facilitate the cooperative communication of data from a source node to a destination node via a plurality of relay nodes, by (a) synchronizing the target subscriber node, a plurality of other subscriber nodes, and the plurality of relay nodes with the base station node in the wireless mobile multi-hop relay network, (b) determining, by the base station node, cooperative transmission functionality of each of the plurality of other subscriber nodes, wherein when a subscriber node supports cooperative transmission functionality, it is also considered a relay node, (c) determining node-to-node channel conditions, between each of the target subscriber node, the plurality of relay nodes including all other subscriber nodes which support cooperative transmission functionality, and the base station node, (d) identifying, by the base station node, a set of potential relay nodes from the plurality of relay nodes to assist in sending data between the target subscriber node and the base station using the determined node-to-node channel conditions, and (e) transmitting, by the base station node, to each of the identified set of potential relay nodes a message informing each of the identified set of potential relay nodes that they are to assist in relaying data between the target subscriber node and the base station node.

At least some of these embodiments provide a simple, yet robust, IEEE 802.16 compliant cooperative PHY-MAC cross-layer framework, based on R-DSTC, that exploits the opportunistic diversity gain of multiple relays.

§3. BRIEF DESCRIPTION OF THE DRAWINGS

FIG. 6 is a table detailing a rate adaptation algorithm for R-DSTC MAC used in an exemplary protocol consistent with the present invention.

Figure 7A:
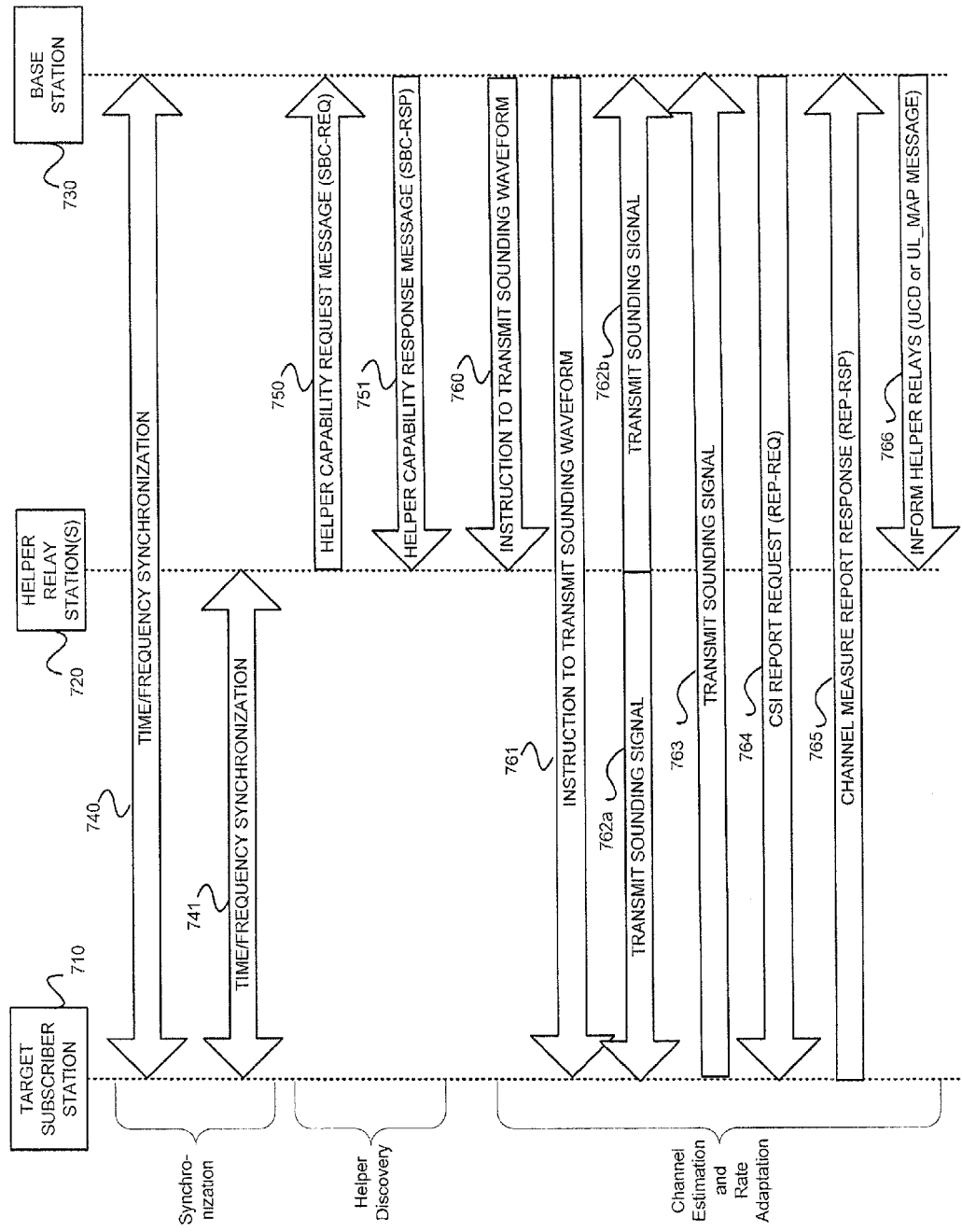
Figure 7B:
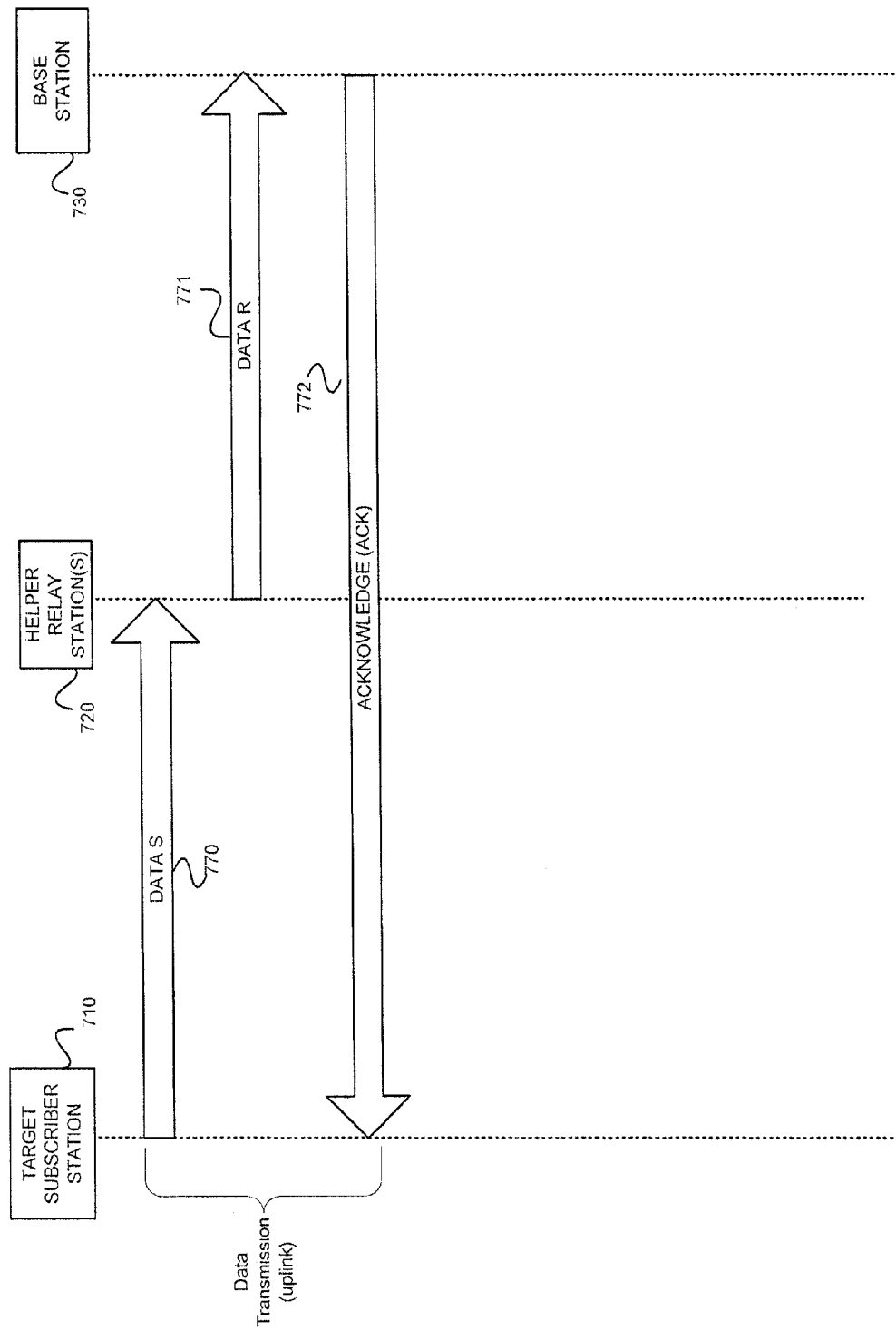

FIG. 7, which includes FIGS. 7A and 7B, is a messaging diagram illustrating communications under an exemplary protocol consistent with the present invention.

Figure 8:
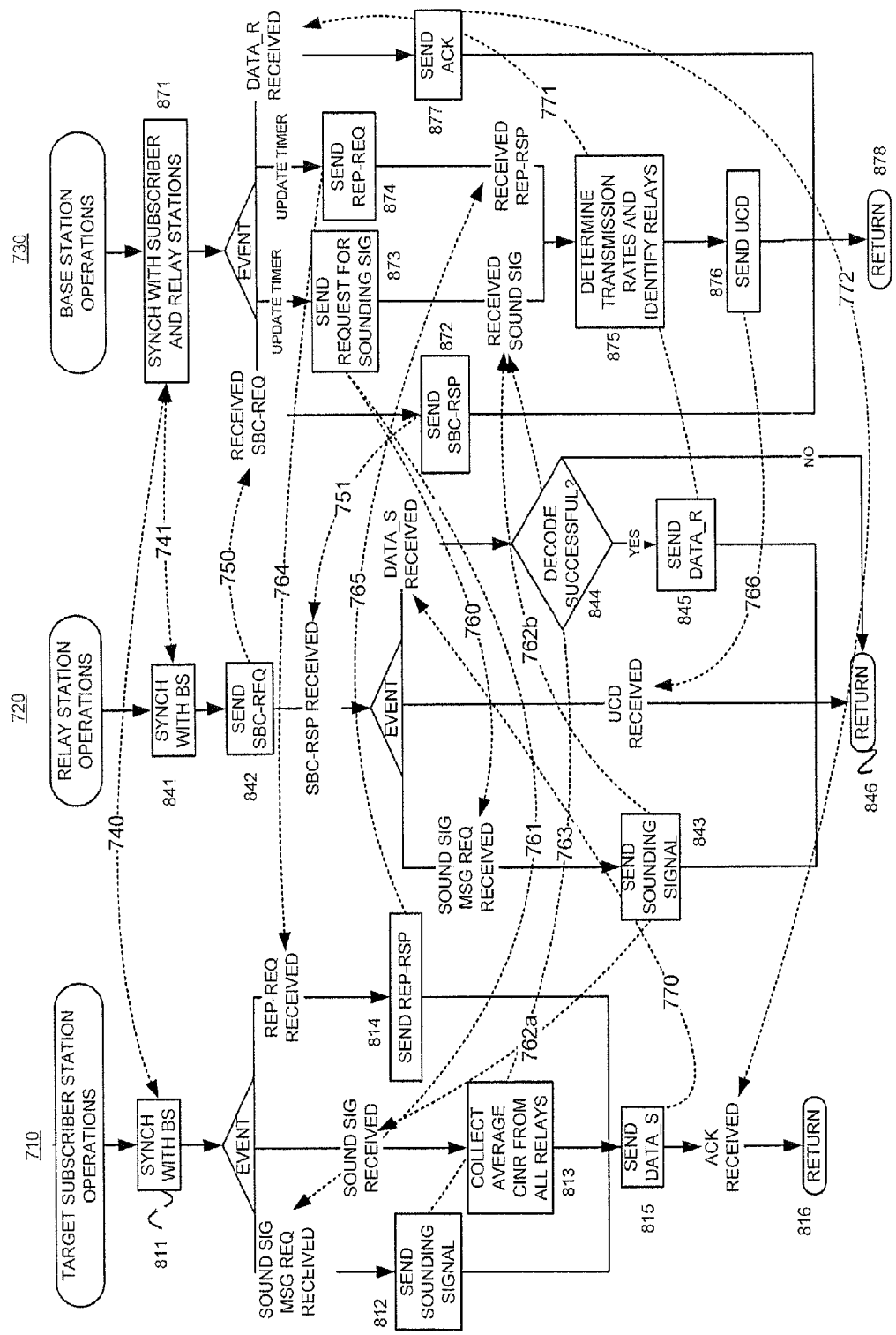

FIG. 8 is a flow diagram of an exemplary CoopMAX-MAC layer protocol operation consistent with the present invention.

FIG. 9 is a table of parameters used in a simulation evaluating the performance of an exemplary protocol consistent with the present invention.

Figure 10:
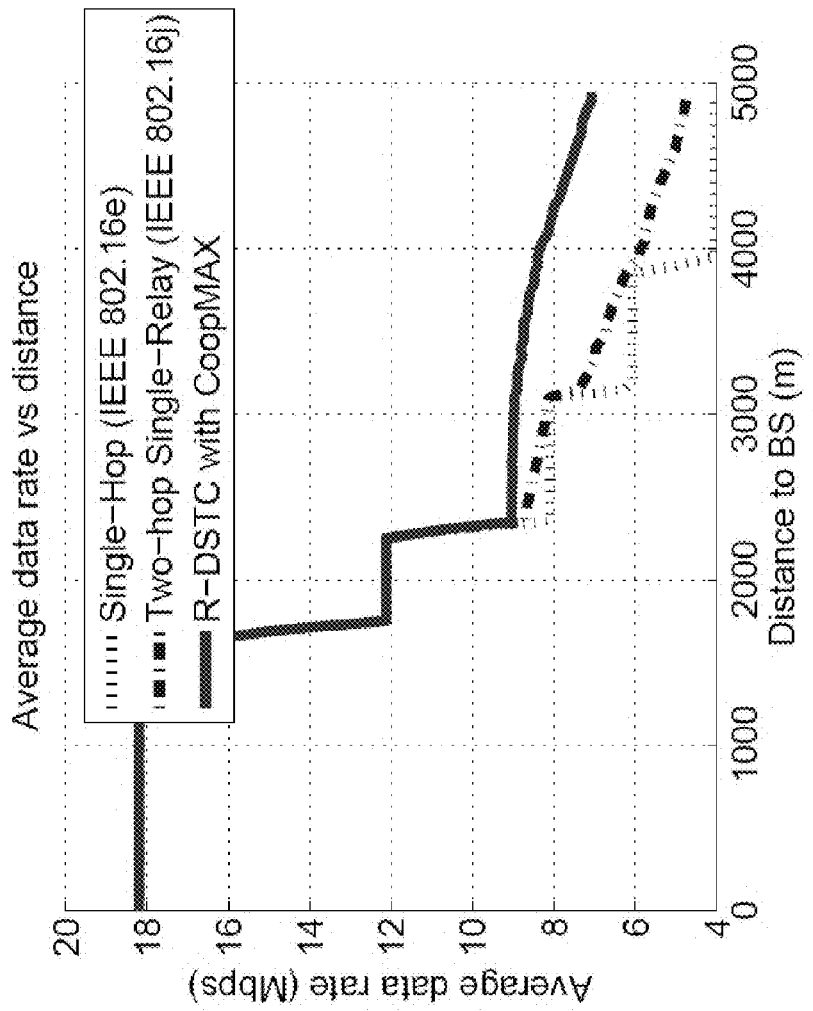

FIG. 10 is a graph illustrating the relationship of average data rate to base station distance in the simulation.

Figure 11:
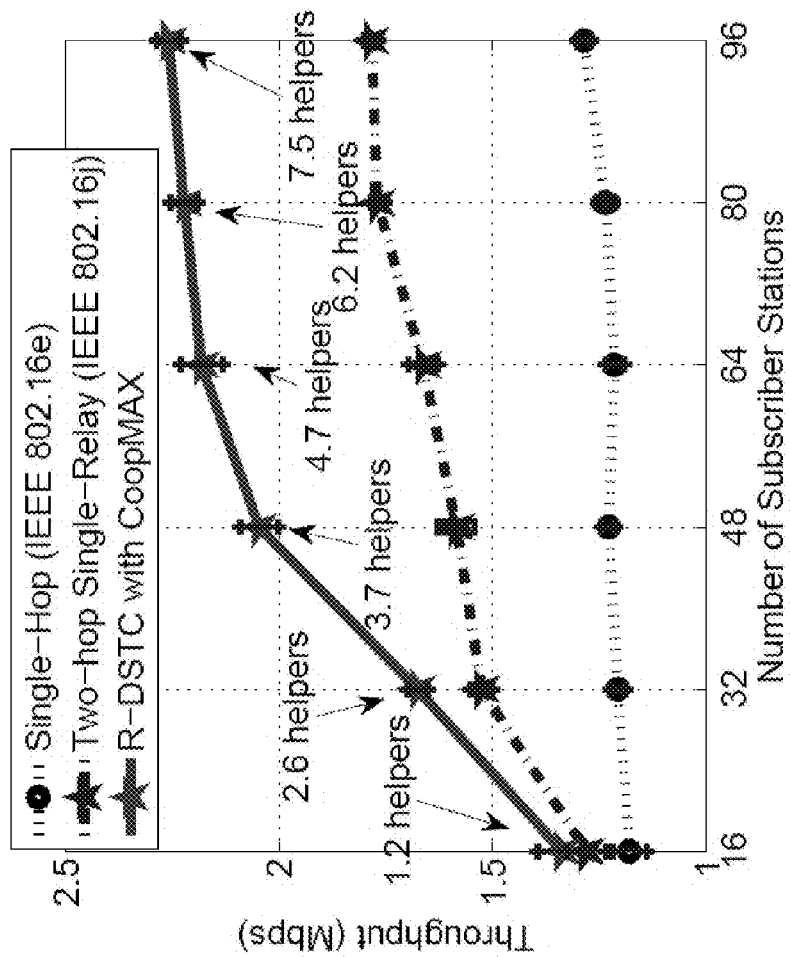

FIG. 11 is a graph illustrating the relationship of WiMAX network aggregated uplink throughput to number of subscriber stations in the simulation.

Figure 12:
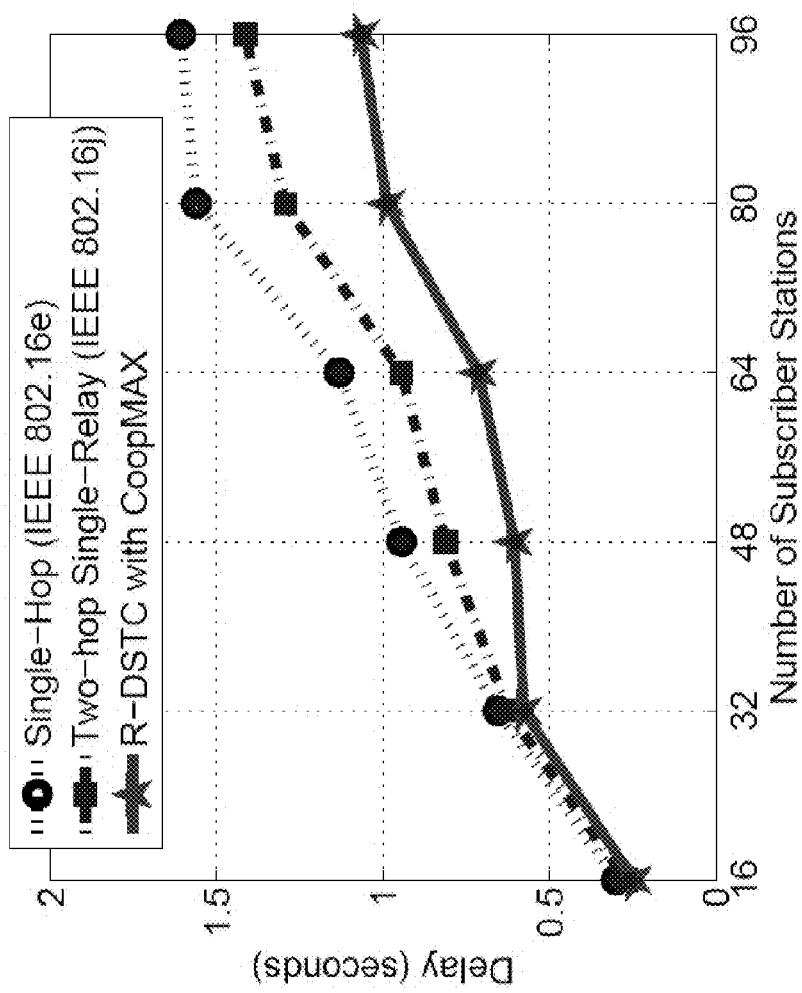

FIG. 12 is a graph illustrating the relationship of service delay to number of subscriber stations in the simulation.

§4. DETAILED DESCRIPTION

The present invention may involve novel methods, apparatus, message formats, and/or data structures for a MAC layer design of a cooperative scheme that uses R-DSTC in the WiMAX system (CoopMAX) which enables robust cooperative communications in a multi-hop environment. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 EXEMPLARY ENVIRONMENT IN WHICH EMBODIMENTS CONSISTENT WITH THE PRESENT INVENTION MAY OPERATE

Figure 1:
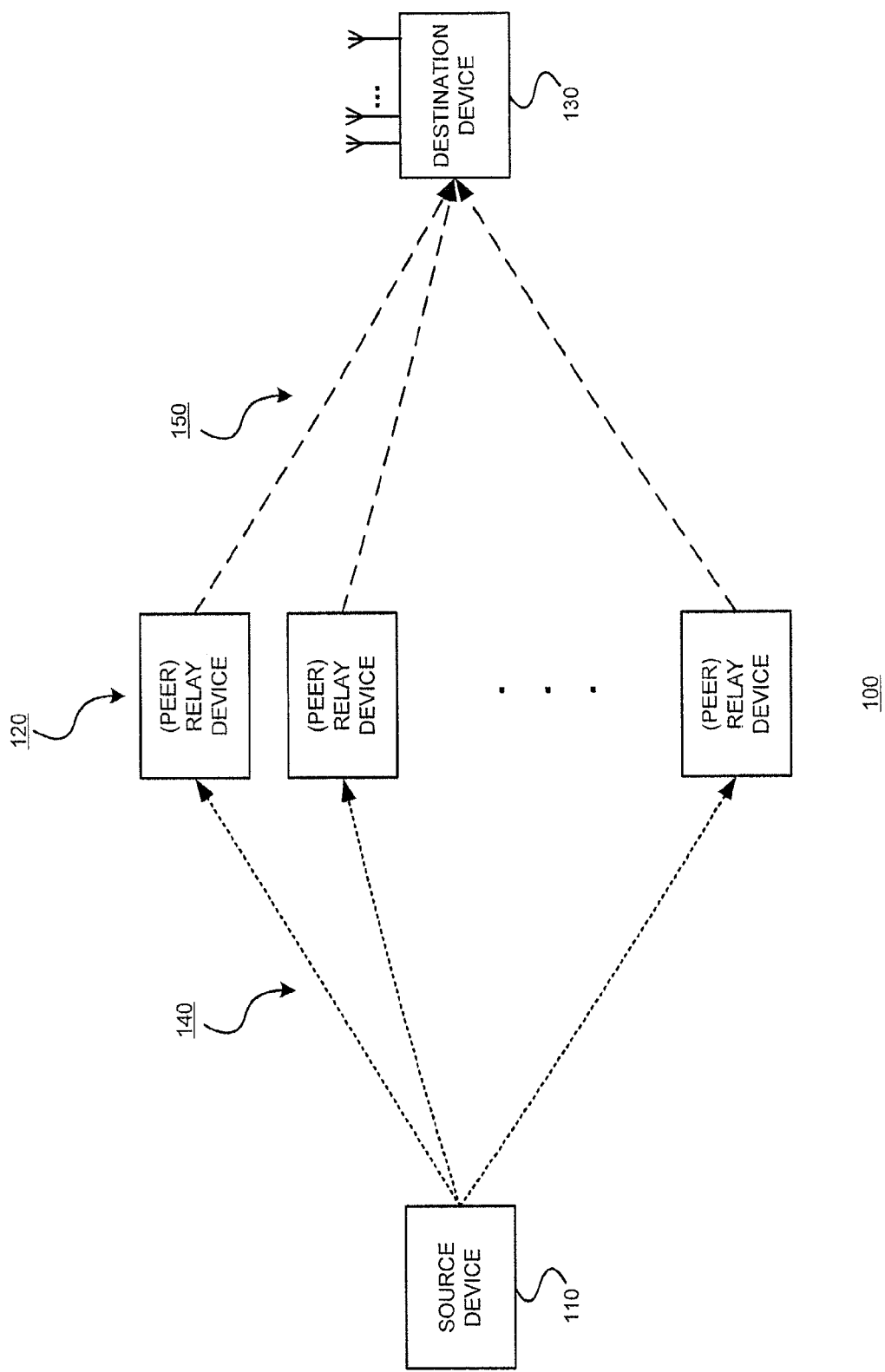
FIG. 1 illustrates an exemplary Cooperative Scenario of an IEEE 802.16 MMR System in which embodiments consistent with the present invention may operate.

FIG. 1 illustrates an exemplary environment 100 in which embodiments consistent with the present invention may operate. As shown, the environment 100 includes a source device 110, a plurality of relay devices 120 and a destination device 130. The source device 110 include may include one antenna, or a plurality of (T) antennas. Assume that the destination device 130 includes a plurality of (L) antennas. There are a total of N source, relay and destination devices in the network.

As shown by lines 140, to maximize spatial multiplexing gain, the source device 110 first broadcasts a data packet (or an "information stream", which is to be interpreted broadly to include a single packet, or a sequence of packets) for receipt by each relay 120. (Note that if the source device has more than one antenna (that is, a plurality of (T) antennas), then multiple streams may be transmitted, and/or multiple instances of the same stream may be transmitted. However, to simplify the description, embodiments consistent with the present invention will be described with reference to a single information stream.) Then, as shown by lines 150, each of the relay devices 120 transmits, using randomized cooperation (in synchronization and in parallel with the other relay devices), to the destination device 130, thereby achieving a high spatial multiplexing gain.

Thus, transmissions from a source to a destination take two hops in FIG. 1. The source first broadcast the packet to the network, and potential relays that receive the correct packet forward jointly, using randomized cooperation. Although FIG. 1 shows only two hops, one skilled in the art skilled in the art would understand that two or more hops may be used for transmissions from a source to a destination.

§4.2 EXEMPLARY APPARATUS

Figure 2:
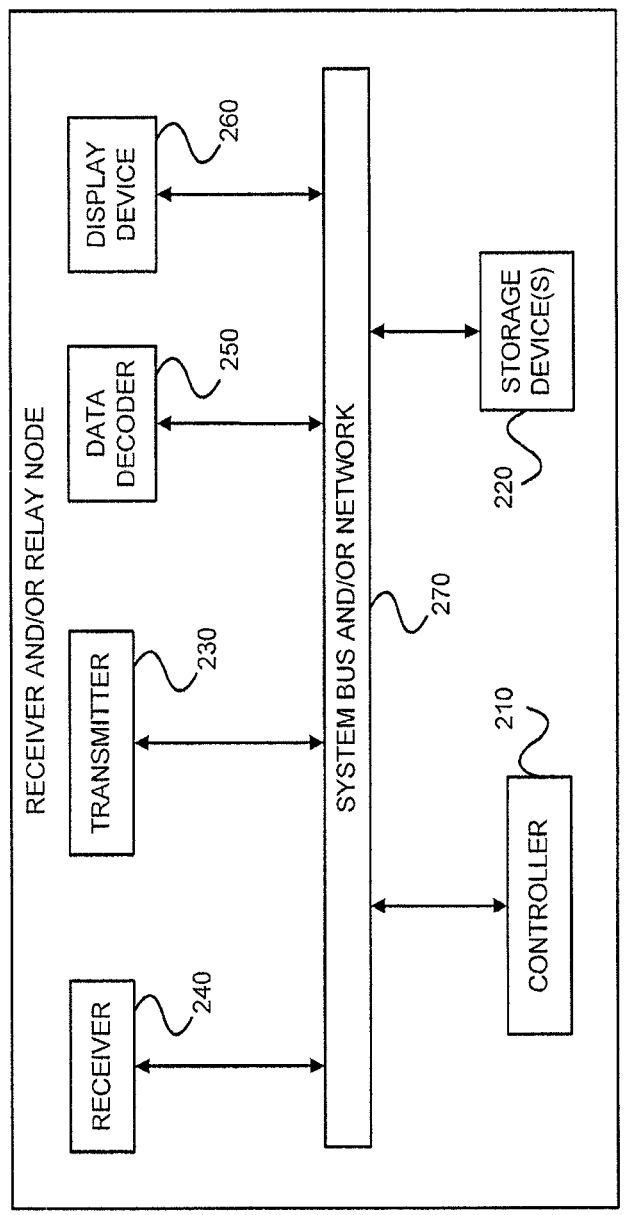
FIG. 2 is a block diagram of exemplary receiver or relay node consistent with the present invention.

FIG. 2 is a block diagram of exemplary receiver or relay node 200 consistent with the present invention. As shown, the node 200 may include a controller 210, one or more storage devices 220, a transmitter 230, a receiver 240, a data decoder 250, an display device 260 and a system bus(es) and/or network(s) 270. The various components 210-260 may communicate with each other via the system bus(es) and/or network(s) 270.

The controller 210 may include a microprocessor, an application specific integrated circuit ("ASIC"), a field programmable gate array ("FPGA"), etc., and may control and coordinate operations of the other components 220-260 of the node 200. The storage device(s) 220 may provide volatile and non-volatile storage of information, and/or program instructions.

The transmitter 230 may operate to relay at least a part of received information (e.g., video, audio, or other types of data) to one or more other receiver nodes.

The receiver 240 may operate to receive one or more layers of information (to be transmitted, to be decoded and viewed, or both). Data decoder 250 may decode received information to be rendered on the node 200. The decoded data may then be rendered on a display device 260. (Audio portions of a data stream may be decoded and rendered on a speaker (not shown).)

Figure 3:
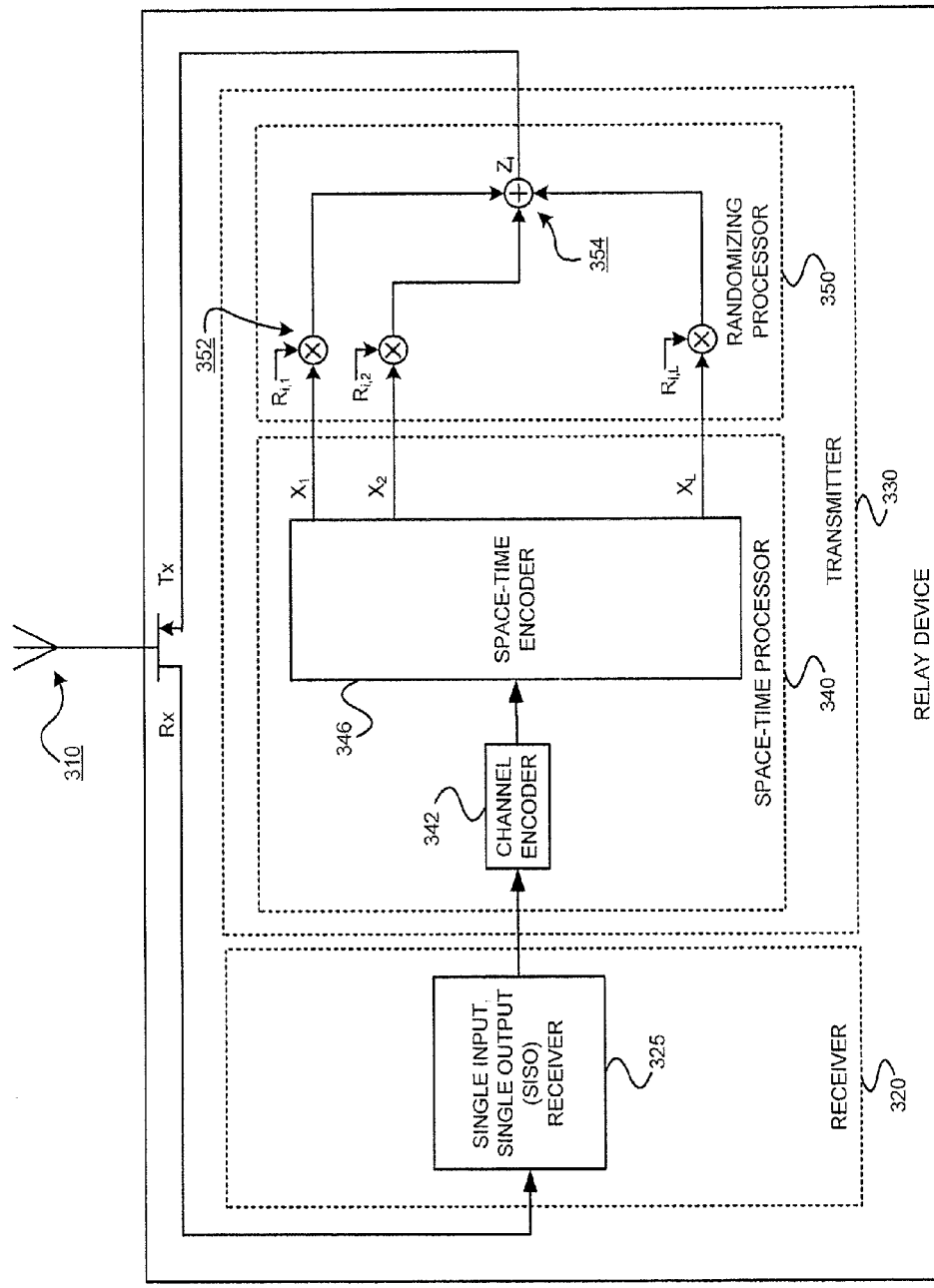
FIG. 3 is a block diagram illustrating an architecture of an exemplary relay device consistent with the present invention.

FIG. 3 is a block diagram illustrating an architecture of an exemplary relay device 300 consistent with the present invention. The exemplary relay device 300 may include a transmit/receive antenna 310, a receiver portion 320 and a transmitter portion 330.

The receiver portion 320 includes a single-input-single-output ("SISO") receiver 325 which accepts a signal received by antenna 310 (from source device), and which outputs a serial signal to the transmitter 330.

The transmitter portion 330 includes a MIMO processor 340 followed by a randomizing processor 350. The MIMO processor 240 may be a known MIMO processor and may use known MIMO processing techniques, which are understood by those skilled in the art. On the other hand, the use of the randomizing processor 350 in the context illustrated is new and advantageous.

The MIMO processor includes a serial-to-parallel converter 342, a plurality of (K) channel encoders 344 and a MIMO encoder 346. Basically, the serial-to-parallel converter 342 converts the serial output signal of the SISO receiver into K signals ($S_1$ through $S_K$). Each of the signals $S_1$ through $S_K$ is encoded by one of the K channel encoders 344 to generate K encoded signals ($X_1$ through $X_K$). The MIMO encoder 346 accepts the K encoded signals $X_1$ through $X_K$ and outputs K signals.

The relay device 300 may include a device for generating a random vector of length K, where each component of the random vector of the $i^{th}$ relay device 300 is denoted as $R_{i,1}$ through $R_{i,K}$ as shown. Each of the K outputs of the MIMO encoder 346 is mixed with each component of the random vector with mixers 352. The K outputs of the K mixers 352 are then combined by combiner 354 to obtain an output signal ($Z_i$). If the number of bits in the received information stream is B, then the number of bits in the output signal $Z_i$ will be B/K. The output signal $Z_i$ is then transmitted for reception by the destination device. Each of the plurality of relay devices will therefore transmit, simultaneously (or effectively simultaneously), a random linear combination of all the K streams.

At least some embodiments consistent with the present invention may be implemented in hardware (e.g., integrated circuits, ASICs, programmable logic or gate arrays, etc.), and/or software (e.g., program instructions stored in memory such as a RAM, ROM, etc., and/or stored on a storage device such as a magnetic or optical disk, etc., and executed on a general purpose processor such as a microprocessor).

§4.3 EXEMPLARY METHODS

In the following, §4.3.1 introduces the IEEE 802.16 MMR system and describes the PHY layer of an R-DSTC system. In particular, the key advantages of R-DSTC that influence the design of higher layers are highlighted. In §4.3.2, the use of a cooperative communication protocol (e.g., CoopMAX) in a WiMAX system is presented. Simulation results in §4.3.3 demonstrate the significant performance gains of CoopMAX in a WiMAX system.

§4.3.1 Exemplary WiMAX MMR System and R-DSTC PHY

In the following, §4.3.1.1 introduces a WiMAX MMR system, §4.3.1.2 describes the R-DSTC PHY layer, and §4.3.1.3 summarizes some advantages that distinguish R-DSTC from regular DSTC alternatives.

§4.3.1.1 Exemplary WiMAX MMR System Overview

The mobile multi-hop relay ("MMR") architecture was proposed in the IEEE 802.16j baseline document (See, "Part 16: Air Anterface for Fixed and Mobile broadband Wireless Access Systems Multihop Relay Specification", supra.) in order to extend the cell coverage and enhance the transmission rate of a conventional WiMAX system. In a typical WiMAX MMR network, three network elements, a base station ("BS"), a relay station ("RS") and a subscriber station ("SS"), are defined. These three elements establish the hierarchical topology of an MMR network. In the MMR cooperative model, both RSs and one or more active SS(s) are recruited to jointly relay signals between the BS and the SSs. Below, a two-hop topology is considered, since a two-hop connection is sufficient in most infrastructure-based network scenarios. Although some embodiments consistent with the claimed invention may use additional hop topologies, additional hops may lead to more signaling overhead and a longer end-to-end air time.

Figure 4:
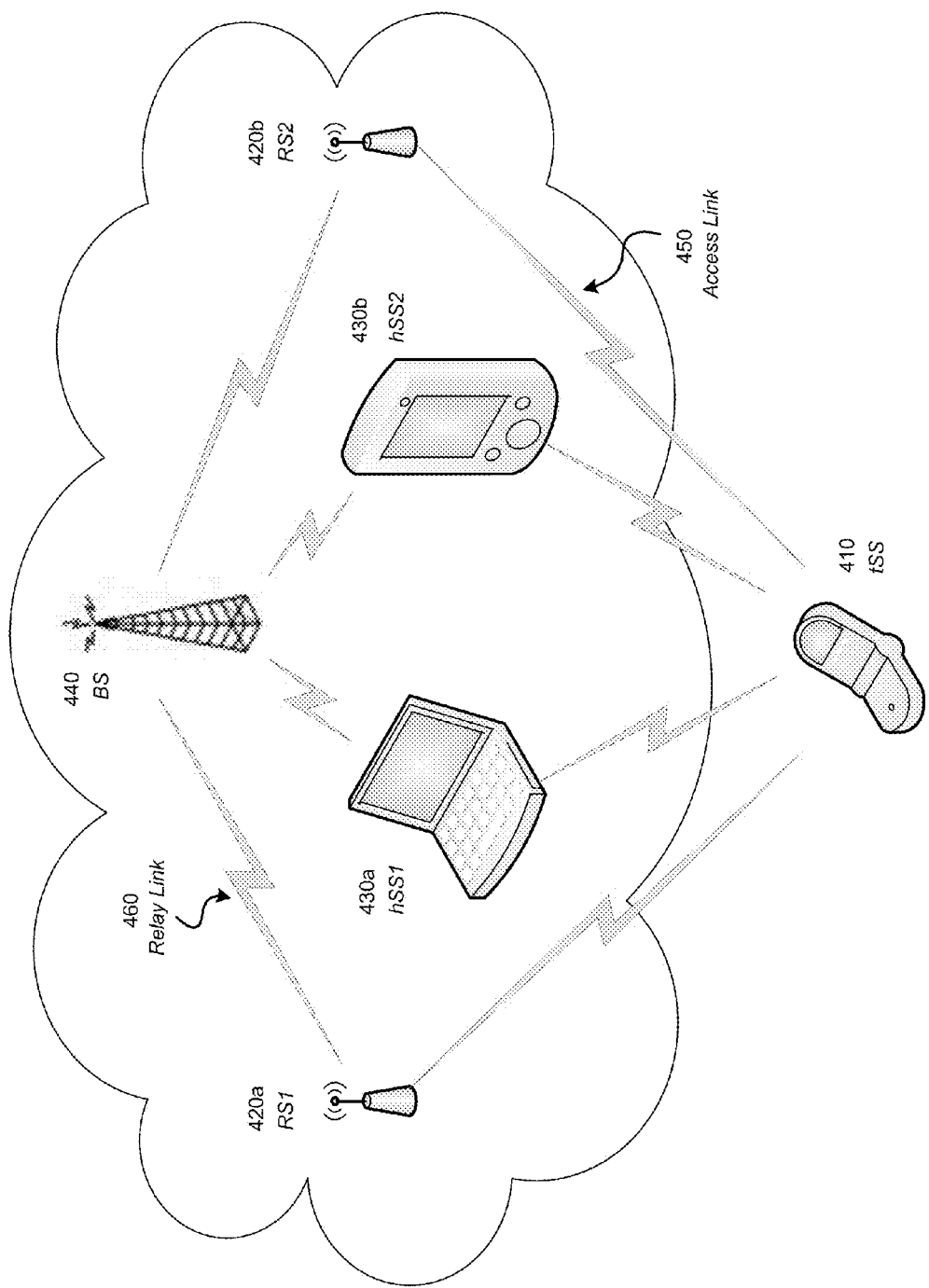
FIG. 4 illustrates a simple example of communications between a source node, relay nodes, helper relay nodes, and a destination node under an exemplary protocol consistent with the present invention.

FIG. 4 depicts a typical cooperative scenario using the following notation. The end target subscriber station is denoted by tSS 410. The base station is denoted by BS 440. The relay station participating in the cooperation is denoted by RS 420a, 420b. The subscriber stations participating in the cooperation are denoted by hSS 430a, 430b. The radio link from the tSS to the RS and hSS is called an access link (AL) 450. Finally, the radio link from the RS to the BS is called a relay link (RL) 460.

The R-DSTC technique can be employed for both the uplink (to BS) and the downlink (from BS) communicating. Below, without loss of generality, the R-DSTC operation is described with respect to an uplink communication. A centralized scheduling procedure is executed by the BS which allocates the channels for both the AL and RL.

§4.3.1.2 Exemplary R-DSTC Physical Layer

In FIG. 4, for the uplink, suppose a tSS 410 intends to transmit to the BS 440. Each end-to-end transmission takes two time/frequency physical slots. In the first slot, the tSS 410 transmits a block of information bits to its associated RS(s) 420a, 420b. When the intermediate RS(s) 420a, 420b are serving a tSS 410, a number of hSS(s) 430a, 430b may also overhear the signals from the tSS 410 and participate in the relaying in the second slot. Below, these RS(s) 420a, 420b and hSS(s) 430a, 430b are denoted as helpers. Each helper first decodes to verify the cyclic redundancy check (CRC) after the reception of a packet. In the second allocated slot, only helpers that receive the packet correctly re-encode and send the packet to the BS 440. In the second hop, multiple helpers transmit in the same time/frequency slot with the proposed R-DSTC. The R-DSTC encoded signals from all helpers are decoded by a STC receiver at the BS 440 and yield a considerable performance gain.

R-DSTC has been introduced and analyzed in recent research (See, e.g., the articles B. S. Mergen et al., *IEEE Transactions on Signal Processing* (October 2007), and B. Sirkeci-Mergen and A. Scaglione, "Randomized Space-Time Coding for Distributed Cooperative Communication," *ICC*, (2006) each of which is incorporated by reference). In an R-DSTC system, each helper is allowed to have one or multiple antennas to support R-DSTC using a virtual antenna array. In the description presented herein, it is assumed that each network element is equipped with a single antenna for simplicity. Further performance gains can be achieved in a multi-antenna system. An exemplary transceiver of a helper is depicted in FIG. 3, discussed above.

As shown in FIG. 3, a single-antenna helper employs a regular single-input and single output ("SISO") decoder 325 to decode the information sent by the tSS 410 in the first hop (AL) 450. The helper then re-encodes the information bits 342 and passes them to a space-time code ("STC") encoder 346. The output from the STC encoder is in the form of L parallel streams, $x_1, x_2, \ldots, x_L$, each stream corresponding to an antenna in a MIMO system with L transmit antennas. In a standard MIMO system, the ith antenna would transmit stream $x_i$. The underlying space-time codeword G is of dimension L×K, where L is the number of signal streams and K is the block length transmitted by each antenna. In contrast to a MIMO system, in a R-DSTC system, the helper transmits a linear weighted combination of all L streams. Each weight is an independently generated random variable with zero mean and variance 1/L. It is shown in B. S. Mergen et al., *IEEE Transactions on Signal Processing* (October 2007) and B. Sirkeci-Mergen, et al., "Randomized Space-Time Coding for Distributed Cooperative Communication," *ICC* (2006) that the complex Gaussian distribution has desirable properties. Suppose N helpers participate in relaying over the second hop, then the vector $r_i=[r_{i1}\ r_{i2}\ \ldots\ r_{iL}]$, where i=1, 2, . . . N, represents the random weights at helper i and $R=[r_1, r_2, \ldots, r_N]^T$ is the weight matrix for all these N helpers.

The destination receiver at the BS in the uplink is a regular STC receiver with one antenna. Assuming the channel from each helper undergoes Rayleigh fading, the received pairwise error probability ("PEP") between two space time coded symbols $G_i$ and $G_k$ is upper bounded by, $$PEP_{ik} \triangleq \mathbb{E}_R\{\mathbb{P}\{G_k \to G_i \mid R\}\} = \mathbb{E}_R\left\{\frac{1}{\det\left(I + \frac{1}{4}\frac{E_s}{N_0}A_{ik}R*\Sigma_h R\right)}\right\} \leq \quad (1)$$

$$\mathbb{E}_R\left\{\frac{1}{\det\left(I + \frac{1}{4}\frac{E_s}{N_0}(\lambda_{min}^{ik})^2 R*\Sigma_h R\right)}\right\},$$

where $A_{ik}=(G_k-G_i)(G_k-G_i)^*$, and $\lambda_{min}^{ik}$ is the minimum eigenvalue for $A_{ik}$. $\Sigma_h$ is a diagonal matrix where the ith diagonal element is the path loss from helper i to the destination and all other elements are zero. (See, e.g., B. S. Mergen et al., *IEEE Transactions on Signal Processing* (October 2007), incorporated herein by reference.) An additive white gaussian noise ("AWGN") with a power spectrum density of $N_0/2$ is assumed. $E_s$ is the symbol energy. In the high SNR region, the above PEP upper bound is used as a good approximation for the exact symbol error rate. As the PEP is influenced by how the STC code is chosen, a rate adaptation algorithm can be used to optimize end-to-end throughput.

§4.3.1.3 R-DSTC Advantages

Some advantages of R-DSTC over regular DSTC alternatives proposed in the literature are introduced below. First, the exact number of helpers is not chosen a-priori. An approximate number of helpers is enough for close to optimum performance. In an R-DSTC system, all nodes that successfully decode the first hop transmission can be incorporated into a cooperative second hop. In principle, more helpers further improve performance. Second, it is not necessary to have a detailed knowledge of the channel conditions between the helpers and the destination to enable close to optimum coding rates and modulation schemes for R-DSTC. Third, unlike DSTC (which needs to allocate a specific antenna index of the underlying STC code to each helper), an allocation of a specific antenna index is unnecessary, and the helpers simply randomize their transmissions. Fourth, R-DSTC does not need as tight synchronization among helpers as that required by DSTC. (See, e.g., M. Sharp, A. Scaglione, and B. Sirkeci-Mergen, "Randomized Cooperation in Asynchronous Dispersive Links," *IEEE Trans. on Communications*, Vol. 57, No. 1, pp. 64-68 (January 2009), incorporated herein by reference). Fifth, the performance of a standard STC system is degraded if the received power from each antenna is imbalanced, which is more severe in a typical DSTC system. (See, e.g., the articles: Badic, J. Salo, P. Suvikunnas, M. Rupp, H. Weinrichter, and I. Salonen, "Evaluation of Space-Time Coded MIMO Transmission in Measured Indoor Channels," *IWS/WPMC* (2005), and W. Ni, G. Shen, and S. Jin, "Cooperative Relay Approaches in IEEE 802.16j," *IEEE C802.16j-07/258r1, IEEE 802.16 Broadband Wireless Access Working Group*, each of which is incorporated herein by reference.) R-DSTC eliminates this deficiency by transmitting a linear combination of all streams of the STC codeword at each helper. Finally, R-DSTC does not substantially increase hardware complexity at each helper or need a major change in existing WiMAX infrastructure.

In addition to the above advantages, R-DSTC is a robust technique and does not lose spatial diversity gain when the number of helpers, N, is larger than its space-time code dimension L. While R-DSTC provides a promising PHY layer technique, it must be supported by the appropriate MAC layer protocol to achieve its potential in a WiMAX network.

§4.3.2 Exemplary MAC Layer Design for R-DSTC

In this section, a novel MAC layer protocol, called CoopMAX, is presented within the framework of the IEEE 802.16 system. CoopMAX provides efficient support for R-DSTC in an IEEE 802.16 network. The CoopMAX protocol is responsible for all MAC layer functionalities and may be incorporated in the current standard framework. The CoopMAX protocol may be operated in sequence as follows: (a) Synchronization; (b) Helper Discovery; (c) Channel Estimation; and (d) Rate Adaptation, each of which is described below. One skilled in the art would understand that the order of operation described below is not necessarily the order in which the protocol may operate. Various potential helper relay stations may enter and exit the network, each performing the some of the steps described at different times. FIGS. 7 and 8 illustrate communications under an exemplary protocol consistent with the present invention.

§4.3.2.1 Synchronization

Since the WiMAX system is based on OFDMA technology in the PHY layer, time/frequency synchronization is used during network entry for R-DSTC. In compliance with the IEEE 802.16 standards, a subscriber station adopts periodic ranging to reach time synchronization with the resolution of a Fast Fourier Transform ("FFT") sampling interval, while ensuring frequency synchronization by means of pilot channels and exchanging frequency offset information. (See 740, 811 and 871 of FIGS. 7 and 8.) The RS can be synchronized with the BS in a similar fashion. (See 741, 841, and 871 of FIGS. 7 and 8.) However, since the requirement of frequency/time synchronization in the exemplary R-DSTC system is looser than that of a DSTC system, the system presented is more robust to the synchronization error caused by mobility and oscillators.

§4.3.2.2 Helper Discovery

Whenever a subscriber station enters the MMR network, it is assigned to one or multiple relay stations according to a predetermined criterion. (See, "Part 16: Air Interface for Fixed and Mobile Broadband Wireless Access Systems: Multihop Relay Specification", supra.) Since an SS may also act as a helper, mechanisms to discover potential helpers with cooperation capability are described below. In the IEEE 802.16 standards, the basic capabilities of each SS are negotiated between the BS and the SS during the WiMAX network entry period. (See, "IEEE Standard for Local and Metropolitan Area Networks—Part 16: Air Interface for Fixed Broadband Wireless Access Systems, Amendment 2 and Corrigendum 1", supra.) The SS first transmits a subscriber station basic capability request ("SBC-REQ") message, which indicates the functionalities that the transmitting SS can support. (See 750 and 842 of FIGS. 7 and 8.) Based on the received SBC-REQ message, the BS can determine whether the SS supports the cooperative functionality or not. Then, the BS sends back a subscriber station basic capability response ("SBC-RSP") message as an acknowledgment. (See 751 and 872 of FIGS. 7 and 8.) The SBC-REQ message may include a cooperative capability field to inform the BS as to whether the specific SS is able to serve as a helper. Consequently, the BS learns the identities of all SS which can act as potential helpers, i.e. hSS(s).

§4.3.2.3 Channel Estimation

In most wireless networks, channel estimation is used for efficient rate adaptation. In an R-DSTC deployment, channel estimation is used to optimize the data rates of the two hops and to identify a set of potential helpers. In the WiMAX MMR network, the channel state information ("CSI") over the access and relay links are probed and reported to the BS. The BS, based upon CSI, can then set the STC that R-DSTC is based on, and determine the data rates over the first and second hops. When the BS is ready to gather the latest channel conditions over the AL and RL, either a proactive or passive estimation is triggered by the BS.

§4.3.2.3.1 Proactive Estimation

Figure 5:
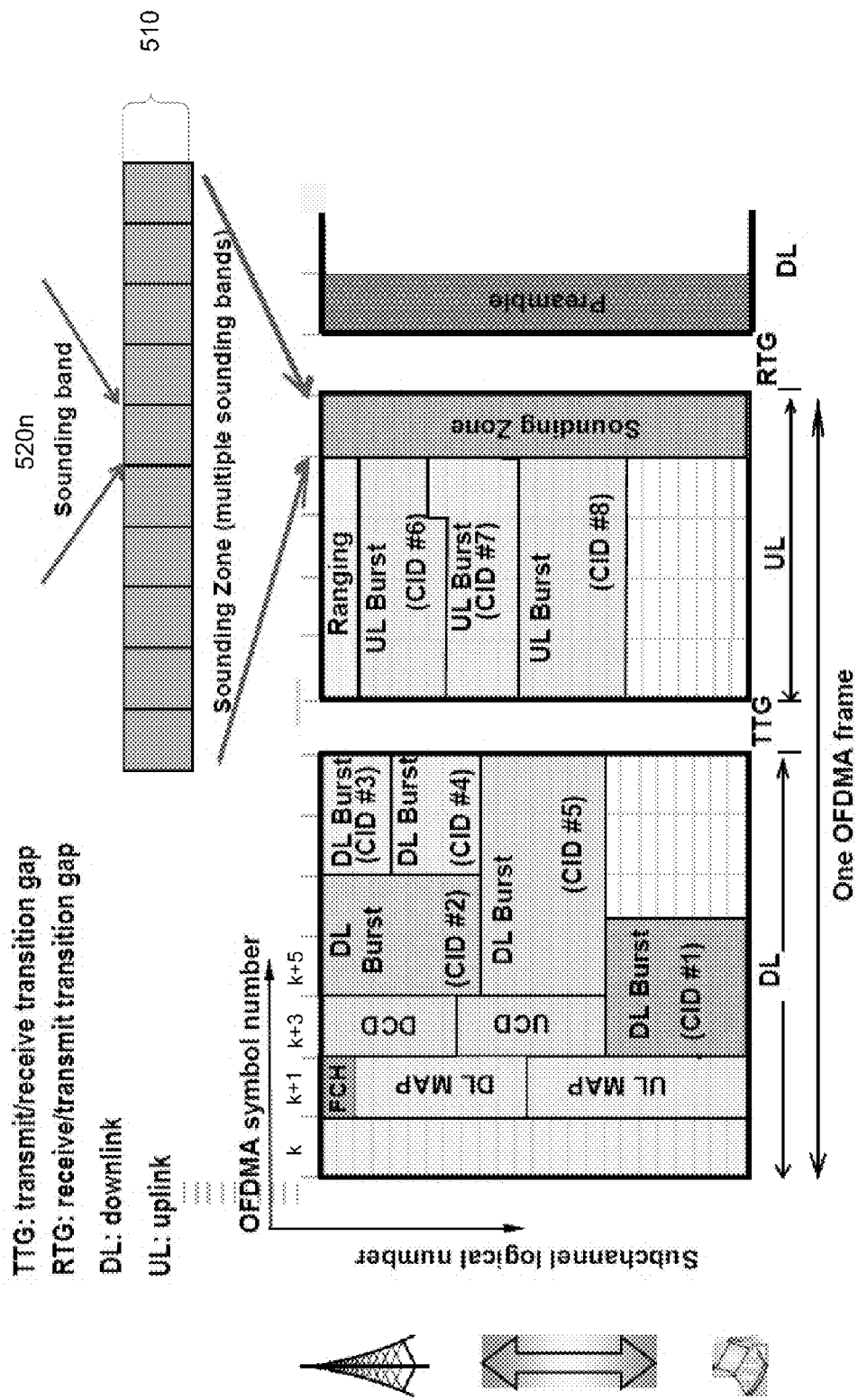
FIG. 5 illustrates an exemplary WiMAX Frame Sounding Zone consistent with the present invention.

Proactive estimation may be performed periodically, depending on how fast the channel state is varying. The basic idea of proactive estimation is to utilize dedicated bandwidth for channel estimation. Channel sounding is used to estimate the channels. In the IEEE 802.16 system, channel sounding is an efficient strategy for the BS to determine the BS-to-SS channel response. The BS allocates a sounding zone, comprised of multiple sounding bands, to each SS. Each subscriber station transmits a specific sounding waveform within a given sounding band such that the BS learns the channel condition from each SS. The sounding zone is shown in FIG. 5.

In CoopMAX, channel sounding may be used to measure station-to-station channel information. More specifically, the BS periodically instructs a station (RS or SS) to transmit its sounding waveform in a sounding band. (See 760, 761 and 873 of FIGS. 7 and 8.) All other stations overhear the sounding signal and estimate the channel responses between them and that station. (See 762a, 762b, 763, 812, and 843 of FIGS. 7 and 8.) Within a sounding zone 510, all subscriber stations and relay stations emit their sounding signals in the allocated sounding bands $520_{a,n}$ such that the station-to-station channel response is measured. As discussed in "IEEE Standard for Local and Metropolitan Area Networks—Part 16: Air Interface for Fixed Broadband Wireless Access Systems, Amendment 2 and Corrigendum 1", supra., multiple stations can generate and multiplex orthogonal sounding signals in a shared sounding band for bandwidth efficiency.

Over the relay link, the BS measures the sounding signals from all stations and obtains the channel state information. For the access link, a tSS collects the average carrier-to-interference-plus-noise ratio ("CINR") from all surrounding stations and then identifies a set of best potential helpers. (See 813 of FIG. 8.) The BS sends a CSI report request ("REPREQ") message to the tSS periodically (See 764 and 874 of FIGS. 7 and 8), which responds with the measured CINR and the connection ID ("CID") of associated helpers to the BS by means of a channel measurement report response ("REP-RSP") message ("IEEE Standard for Local and Metropolitan Area Networks—Part 16: Air Interface for Fixed Broadband Wireless Access Systems, Amendment 2 and Corrigendum 1", supra.). (See 765 and 814 of FIGS. 7 and 8.) Consequently, the BS collects the channel information over both AL and RL as a criterion to optimize the transmissions over the two hops. (See 875 of FIG. 8.) At the same time, the BS notifies all or part of the potential helpers to monitor the traffic transmission from the tSS by WiMAX signaling. (See 766 and 876 of FIGS. 7 and 8.) These potential helpers may participate the relaying.

One advantage of proactive estimation is that the BS can collect accurate station-to-station CSI for rate adaptation, as will be described in Section III-D. Proactive estimation can be triggered in an interval equal to the channel coherence time or more frequently, for recruiting a different set of helpers if necessary. The estimation interval may be adapted by the BS by measuring the pilot signals from each SS and learning how fast the BS-SS channel is varying. Even when the estimated CSI is sometimes outdated, R-DSTC with CoopMAX still outperforms regular DSTC.

§4.3.2.3.2 Passive Estimation

As mentioned above, channel sounding is triggered periodically. Between two consecutive sounding zone allocations, passive estimation may be conducted to update the channel information over the AL and RL. In contrast to channel sounding, passive estimation does not consume any dedicated bandwidth. Instead, over the access link, a tSS decodes the WiMAX frame header to locate the resource grants of its potential helpers in every frame and monitors their ongoing traffic over time. In this way, the channel state information between these potential helpers and the tSS is updated by the tSS for the AL. Similarly, the ongoing traffic from the potential helpers are also measured by the BS over the relay link. When the BS needs to retrieve the latest CSI report of AL from a tSS, the updated CINR of each helper is reported in REP-REQ/REP-RSP handshaking message. Passive estimation avoids using dedicated resources for channel estimation and is bandwidth efficient.

§4.3.2.4 Rate Adaptation

A key element of CoopMAX is its support for rate adaptation, which is not defined by IEEE 802.16j multi-hop system. After receiving the channel state information from the AL and RL, the BS optimizes performance metrics, such as throughput and delay, by employing rate adaptation over the fluctuating channel. (See 875 of FIG. 8.) The rate adaptation is responsible for varying the transmission rate increase to (e.g., maximize) the attainable throughput of each SS, while satisfying an acceptable error probability. An exemplary rate adaptation used in embodiments consistent with the claimed invention includes the joint selection of STC codes and transmission rates over the two hops. Suppose there is a set of STC codes, (D, that can be used by CoopMAX. The transmission rates that the PHY layer can support are denoted as $R_p$, p= 0, . . . P, where $R_0 < R_1 < \ldots < R_P$. Let $R_{direct}$ denote the achievable rate for the direct transmission from the tSS to the BS. At each transmission rate $R_p$, a tSS can connect to a different number of helpers, subject to a given error probability. Assuming that $N_p$ represents the number of helpers that a tSS can establish a reliable transmission using rate $R_p$, then $N_0 \geq N_1 \geq \ldots \geq N_p$. As the channel statistics change, the value of $N_p$ could be updated accordingly. In both AL and RL, the tSS and helpers transmit at their maximum achievable rate.

Table I in FIG. 6 summarizes the rate adaptation algorithm for tSS, assuming each station has up-to date channel information. The algorithm in Table I of FIG. 6 searches for the optimal combination of modulation, coding and STC code for the two hops such that the effective end-to-end throughput is maximized. Since an SS does not monitor the data transmission of other SS(s) by default in a WiMAX system, the BS informs a number of potential helpers of the chosen STC and the assisted tSS by means of an R-DSTC Control UL Information Element ("R-DSTC UL Control IE") embedded in the uplink channel descriptor ("UCD") message or UL_MAP message. (See 766, 767 and 876 of FIGS. 7 and 8.) These potential helpers, upon receiving such information from the BS, can start to listen to the traffic from the designated tSS and determine whether to relay the signals in the second hop.

§4.3.2.5 Data Transmission

After the CoopMAX protocol has been established, potential helpers, upon receiving such information from the BS, can start to listen to the traffic from the designated tSS and determine whether to relay the signals in the second hop. For example, in one exemplary embodiment consistent with the present invention, when a tSS 710 sends data to the BS 770 (uplink), the helper relay station 740 will listen for the data (See 770) and attempt to decode the data sent from the tSS (See 844). If the helper relay station 740 can successfully decode the data, it will forward the data do the BS (See 771 and 845.) The BS will send an acknowledgement ("ACK") back to the tSS acknowledging receipt of the data. (See 772 and 877) If the helper relay station 740 cannot not decode the data, it does not participate in forwarding the packet to the destination. (See 844.) Similar operations may occur in a downlink situation (i.e., data sent from BS to tSS).

§4.3.3 Alternatives, Refinements and Extensions

The messages described above may be compliant with IEEE 802.16, though this is not strictly necessary.

As noted above, although an exemplary sequence is presented above, one skilled in the art would understand that the order of operation presented is not necessarily the order in which the protocol may operate. Various potential helper relay stations may enter and exit the network, each performing the some of the steps described at different times.

Although one example of WiMAX synchronization is generally described above, there may be multiple levels of synchronization used in the CoopMAX protocol, which may include (A) loose synchronization and (B) tight synchronization.

The CID (connection ID) described above is a logical identifier which identifies the connection between a subscriber station and a base station. The CID may be set during network entry and may contain a plurality of network hops.

Although the source, relay and destination devices may be described as "stations", embodiments consistent with the present invention can work with any type of wireless node, whether stationary or mobile.

§4.4 PERFORMANCE EVALUATION

The performance of the aforementioned CoopMAX protocol in the WiMAX system has been evaluated using the OPNET package. In simulation scenarios, the BS was located at the center of the WiMAX cell with a radius of 1 km; the link was based on the COST 231 Hata propagation model (See, e.g., J. G. Andrews, A. Ghosh, and R. Muhamed, *Fundamentals of WiMAX. Understanding Broadband Wireless Networking* (Prentice Hall, 2007), incorporated herein by reference) and Rayleigh fading. Several RS(s) and a number of SS(s) were uniformly distributed in the cell. Each tSS has one RS for signaling and one or more SSs as helpers. All network elements, including the BS, RS and SS, are equipped with one antenna and are assumed to have the same transmit power for simplicity. The simulation results present a performance evaluation for the uplink transmission, assuming the uplink/downlink bandwidth ratio as 1/3. In compliance with the IEEE 802.16 standard, the available modulation and channel coding schemes consist of QPSK rate 1/2, QPSK rate 3/4, QAM16 rate 1/2, QAM16 rate 3/4, QAM64 rate 2/3 and QAM64 rate 3/4. The underlying STC codewords used by RDSTC helpers include the 2-antenna Alamouti code (rate 1/2), 3-antenna orthogonal STC (rate 3/4) and 4-antenna (rate 3/4). (See, e.g., V. Tarokh, H. Jafarkhani, and A. R. Calderbank, "Space Time Block Codes from Orthogonal Designs," *IEEE Trans. on Info. Theory*, Vol. 45, No. 5, pp. 1456-1467 (July 1999) incorporated herein by reference.) We assume a target block error rate ("BLER"), which is derived from BER and thus related to PER above, of 10% (See, J. G. Andrews, et al., Prentice Hall, 2007, supra.) over each hop. The transmit power of each SS allows the subscriber station on the cell edge to reach the BS with a QPSK rate 1/2 scheme in a direct transmission.

The MAC layer performance was measured in terms of throughput and delay metric. The simulation results display 95% confidence intervals. To reach the maximal system capacity that R-DSTC can support, it was assumed that each subscriber station is loaded with saturated traffic. In the simulation, modified weighted round robin ("MWRR") (See, e.g., S. Vegesna, *IP Quality of Service* (Cisco Press, 2001), incorporated herein by reference) was executed as the MAC layer scheduling method such that each SS can transmit based on MWRR. R-DSTC was compared with the conventional IEEE 802.16e single-hop transmission scheme and a two-hop single-relay scheme proposed in the IEEE 802.16j. As distinct from R-DSTC, the single-relay scheme only allows each SS to chooses one RS as the intermediate node in a way that provides the maximum endto-end throughput.

CoopMAX selects the optimal modulation, coding and STC codeword to support a maximal end-to-end transmission rate for each tSS, i.e. $R_C^*$, as defined in Table I of FIG. 6. FIG. 8 depicts the raw physical rate for a tSS as the distance from the BS increases, assuming the system serves 64 subscriber stations. The end-to-end data rate was boosted by R-DSTC when a tSS moves far away from the BS. Note that the subscriber stations at the edge of the cell that have the poorest link access rates see the greatest improvement.

FIG. 9 illustrates the average aggregated uplink throughput as a function of the number of subscriber stations. The reduction of throughput due to increased CoopMAX signaling overhead is incorporated using parameters defined in Table II in FIG. 7.

The "throughput" is defined as the total data traffic in terms of bits/second successfully received by the WiMAX MAC layer at the BS. Note that the throughput increases with the number of subscriber stations in the network, since each subscriber station will find more helpers. FIG. 9 also depicts the average number of helpers for each scenario. The increased number of helpers enables CoopMAX to support a higher per-hop rate. When the per-hop rate has reached its limit, e.g. using 64QAM rate 3/4, the end-to-end throughput of R-DSTC arrives at its maximum throughput bound. FIG. 9 shows that R-DSTC can achieve up to 77% throughput gain over a single-hop transmission.

FIG. 10 reveals the average delay performance for different transmission schemes. The delay metric measures the end-to-end latency of all the data packets that are successfully received by the WiMAX MAC layer at the BS. As illustrated in FIG. 10, the average delay for a packet is considerably reduced by using R-DSTC based CoopMAX protocol.

§4.5 CONCLUSION

The foregoing describes an exemplary cooperative communication protocol, such as a MAC layer design for a cooperative scheme that uses R-DSTC in the WiMAX system. The exemplary cooperative communication protocol enables robust cooperative communications in a multi-hop environment. The exemplary cooperative communication protocol teaches all the elements needed for a MAC layer design in a IEEE 802.16 network. The foregoing design is compatible with current WiMAX systems and only requires marginal modifications to IEEE 802.16d/e standards. While the discussion of the cooperative communication protocol focuses on the uplink of a WiMAX system, it is suitable for the downlink scenario without major changes.

What is claimed is:

1. For use in a WiMAX wireless mobile multi-hop relay network, a processor-implemented method for facilitating cooperative communication of data between a target subscriber node and a base station node via a plurality of relay nodes, the processor-implemented method comprising:
   a) synchronizing the target subscriber node, a plurality of other subscriber nodes, and the plurality of relay nodes with the base station node in the wireless mobile multi-hop relay network;
   b) determining, by the base station node, cooperative transmission functionality of each of the plurality of other subscriber nodes, wherein when a subscriber node supports cooperative transmission functionality, it is also considered a relay node;
   c) determining node-to-node channel conditions, between each of the target subscriber node, the plurality of relay nodes including all other subscriber nodes which support cooperative transmission functionality, and the base station node;
   d) identifying, by the base station node, a set of potential relay nodes from the plurality of relay nodes to assist in sending data between the target subscriber node and the base station using the determined node-to-node channel conditions; and
   e) transmitting, by the base station node, to each of the identified set of potential relay nodes a message informing each of the identified set of potential relay nodes that they are to assist in relaying data between the target subscriber node and the base station node,
      wherein the act of determining cooperative transmission functionality of each of the plurality of other subscriber nodes includes
   receiving, by the base station node, a helper capability request message from each of the plurality of other subscriber nodes, and
   sending, from the base station node, a helper capability response message to each of the plurality of other subscriber nodes from which a helper capability request message was received, and
      wherein the helper capability request message received from each of the plurality of other subscriber nodes includes a cooperative capability field that indicates whether a subscriber node is able to serve as a helper relay.

2. For use in a WiMAX wireless mobile multi-hop relay network, a processor-implemented method for facilitating cooperative communication of data between a target subscriber node and a base station node via a plurality of relay nodes, the processor-implemented method comprising:
   a) synchronizing the target subscriber node, a plurality of other subscriber nodes, and the plurality of relay nodes with the base station node in the wireless mobile multi-hop relay network;
   b) determining, by the base station node, cooperative transmission functionality of each of the plurality of other subscriber nodes, wherein when a subscriber node supports cooperative transmission functionality, it is also considered a relay node;
   c) determining node-to-node channel conditions, between each of the target subscriber node, the plurality of relay nodes including all other subscriber nodes which support cooperative transmission functionality, and the base station node;
   d) identifying, by the base station node, a set of potential relay nodes from the plurality of relay nodes to assist in sending data between the target subscriber node and the base station using the determined node-to-node channel conditions;
   e) transmitting, by the base station node, to each of the identified set of potential relay nodes a message informing each of the identified set of potential relay nodes that they are to assist in relaying data between the target subscriber node and the base station node;
   f) receiving, with each of the identified potential relay nodes, a transmission of data from the target subscriber node to be sent to the base station node; and g) relaying, with each of the identified potential relay nodes, a space-time encoded part of the received data, to the base station node.

3. The processor-implemented method of claim 2, wherein the act of determining node-to-node channel conditions, between each of the target subscriber node, the plurality of relay nodes including all other subscriber nodes which support cooperative transmission functionality, and the base station node includes
sending instructions to the target subscriber node and each of the plurality of relay nodes including all other subscriber nodes which support cooperative transmission functionality to transmit sounding waveform information,
transmitting sounding waveform information from the target subscriber node to the base station node,
receiving, by the base station node, the sounding waveform information sent by the target subscriber node and storing the received sounding waveform information,
transmitting sounding waveform information from each of the plurality of relay nodes including all other subscriber nodes which support cooperative transmission functionality to the base station node and the target subscriber node,
receiving, by the base station node, the sounding waveform information sent by the plurality of relay nodes including all other subscriber nodes which support cooperative transmission functionality and storing the received sounding waveform information, and
receiving, by the target subscriber node, the sounding waveform information sent by the plurality of relay nodes including all other subscriber nodes which support cooperative transmission functionality and storing the received sounding waveform information.

4. The processor-implemented method of claim 2, wherein the act of determining node-to-node channel conditions, between each of the target subscriber node, the plurality of relay nodes including all other subscriber nodes which support cooperative transmission functionality, and the base station node includes using at least one of (A) proactive channel estimation or (B) passive channel estimation.

5. The processor-implemented method of claim 2, wherein the act of identifying a set of potential relay nodes from the plurality of relay nodes to assist in sending data between the target subscriber node and the base station using the determined node-to-node channel conditions includes using rate adaptation which maximizes transmission rates between each network hop that is part of one or more network paths between base station node and the target subscriber node while satisfying acceptable error probabilities.

6. The processor-implemented method of claim 2, wherein the transmitted message informing each of the identified set of potential relay nodes that they are to assist in relaying data between the target subscriber node and the base station node includes network communication information required by the relay nodes to relay data between the target subscriber node and the base station node.

7. The processor-implemented method of claim 2, wherein the data received from the target subscriber node is transmitted only by those identified potential relay nodes which can successfully decode the received data.

8. The processor-implemented method of claim 2, wherein the space-time encoded part of the received data relayed is a randomized space-time encoded part of the received data.

9. The processor-implemented method of claim 3, wherein the act of receiving, by the target subscriber node, the sounding waveform information sent by the plurality of relay nodes including all other subscriber nodes which support cooperative transmission functionality includes
collecting, by the target subscriber node, average carrier-to-interference-plus-noise ratio ("CINR") information between the target subscriber node and each of the plurality of relay nodes including all other subscriber nodes which support cooperative transmission functionality from which sounding waveform information was received, and
storing the CINR information in a channel station information ("CSI") report.

10. The processor-implemented method of claim 6, wherein the network communication information includes a chosen space-time code ("STC") and the target subscribed node to be assisted.

11. The processor-implemented method of claim 9, wherein the act of determining node-to-node channel conditions, between each of the target subscriber node, the plurality of relay nodes including all other subscriber nodes which support cooperative transmission functionality, and the base station node further includes
sending, from the base station node, a request for the CSI report stored by the target subscriber node, and
receiving, by the base station node, the requested CSI report from the target subscriber node.

12. The processor-implemented method of claim 10, wherein the chosen STC and the target subscribed node to be assisted are identified by a Randomized Distributed Space-time Coding (R-DSTC) Control UL Information Element included in the transmitted message.

13. The processor-implemented method of claim 12, wherein the transmitted message informing each of the identified set of potential relay nodes that they are to assist in relaying data between the target subscriber node and the base station node is one of an uplink channel descriptor message or an UL_MAP message.

14. The processor-implemented method of claim 13, wherein the data received from the target subscriber node is transmitted only by those identified potential relay nodes which can successfully decode the received data.

15. A system comprising:
a) a target subscriber node;
b) base station node; and
c) a plurality of relay nodes,
wherein the target subscriber node, the base station node and the plurality of relay nodes are provided in a WiMAX wireless mobile multi-hop relay network and collectively execute a protocol for synchronizing the target subscriber node, a plurality of other subscriber nodes, and the plurality of relay nodes with the base station node in the wireless mobile multi-hop relay network,
wherein the base station node is adapted to determine cooperative transmission functionality of each of the plurality of other subscriber nodes, wherein when a subscriber node supports cooperative transmission functionality, it is also considered a relay node,
wherein the target subscriber node, the base station node and the plurality of relay nodes collectively execute a protocol for determining node-to-node channel conditions, between each of the target subscriber node, the plurality of relay nodes including all other subscriber nodes which support cooperative transmission functionality, and the base station node,
wherein the base station node is further adapted to identify a set of potential relay nodes from the plurality of relay nodes to assist in sending data between the target subscriber node and the base station using the determined node-to-node channel conditions, wherein the base station node includes a transmitter adapted to transmit to each of the identified set of potential relay nodes a message informing each of the identified set of potential relay nodes that they are to assist in relaying data between the target subscriber node and the base station node, and wherein each of the identified potential relay nodes is adapted to (1) receive a transmission of data from the target subscriber node to be sent to the base station node and (2) relay a space-time encoded part of the received data, to the base station node.

16. The system of claim 15, wherein the base station node identifies a set of potential relay nodes from the plurality of relay nodes to assist in sending data between the target subscriber node and the base station node using the determined node-to-node channel conditions by adapting a rate to maximize transmission rates between each network hop that is part of one or more network paths between base station node and the target subscriber node while satisfying acceptable error probabilities.

* * * * *